Aug. 20, 1957    E. H. B. BARTELINK ET AL    2,803,820
COMPUTER
Filed Sept. 14, 1945      4 Sheets-Sheet 1
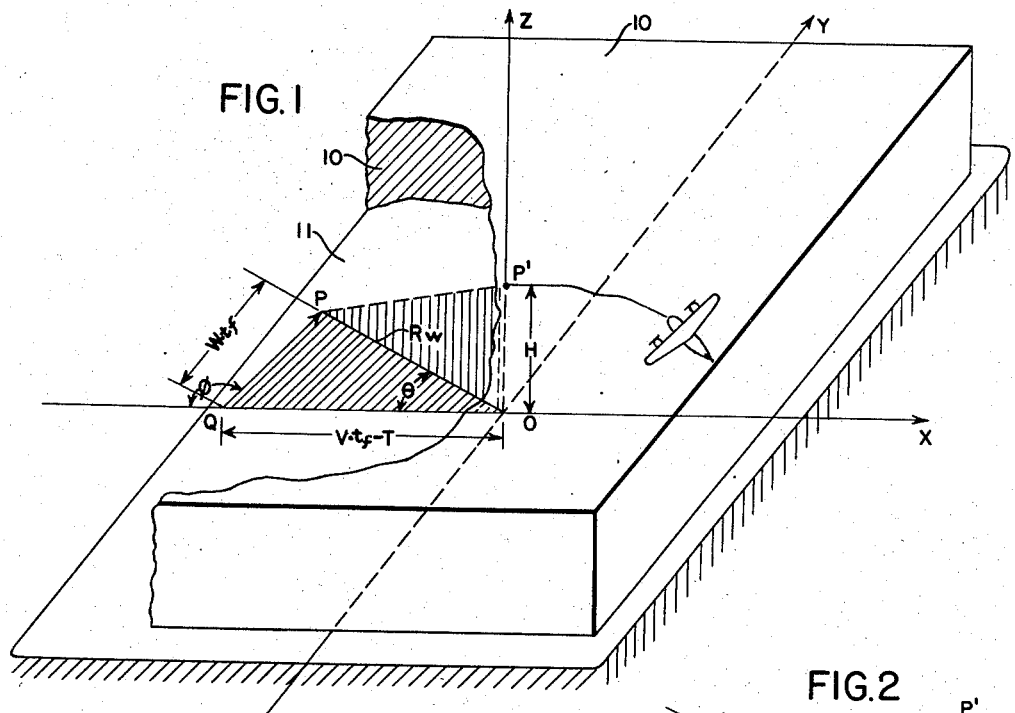
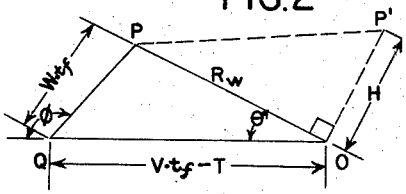
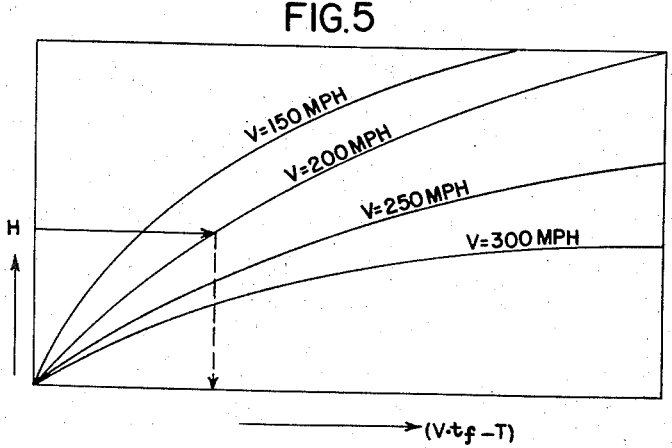
INVENTORS
EVERHARD H. B. BARTELINK
WILLOUGHBY M. CADY
BY
William D. Hall
ATTORNEY Aug. 20, 1957     E. H. B. BARTELINK ET AL     2,803,820
COMPUTER Filed Sept. 14, 1945     4 Sheets-Sheet 2

INVENTORS
EVERHARD H. B. BARTELINK
WILLOUGHBY M. CADY
BY
*William D. Hall*
ATTORNEY

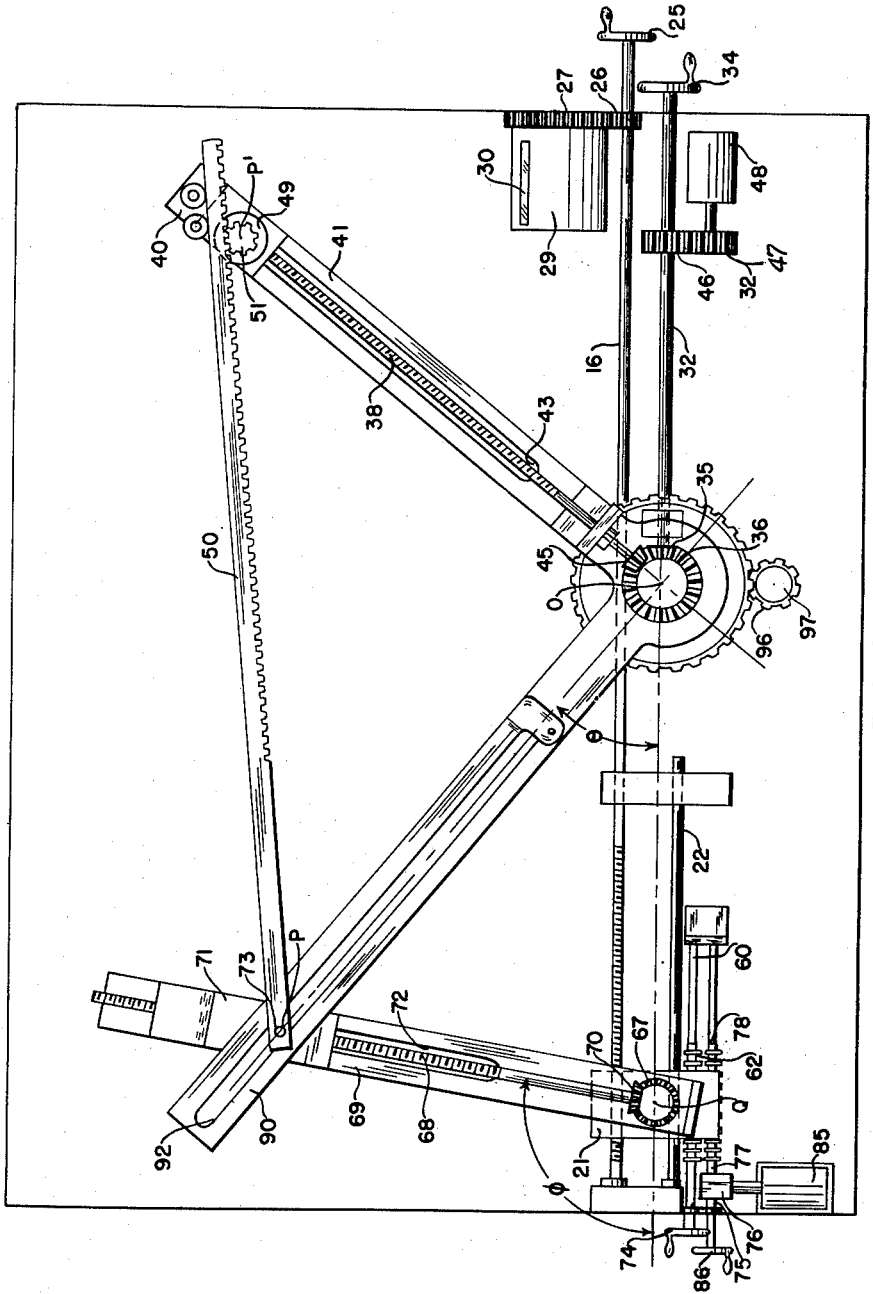

Aug. 20, 1957  E. H. B. BARTELINK ET AL  2,803,820
COMPUTER
Filed Sept. 14, 1945  4 Sheets-Sheet 4
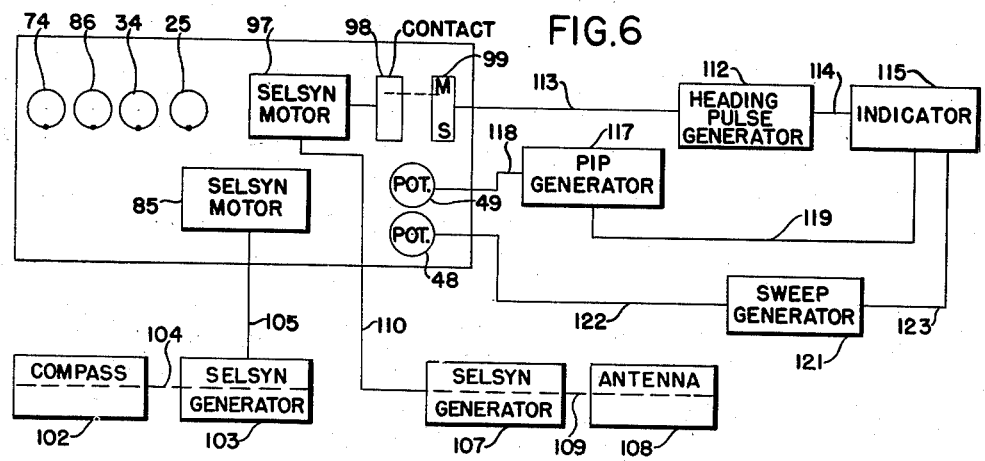
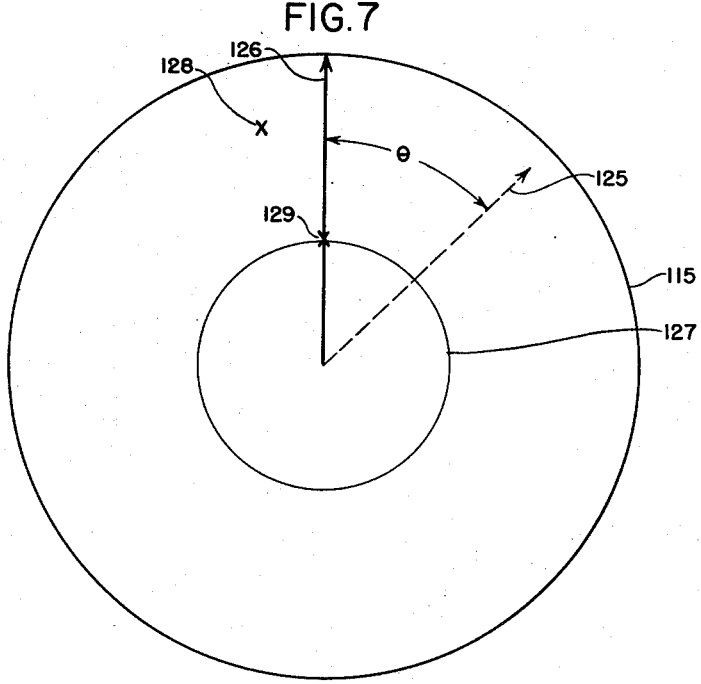
INVENTORS
EVERHARD H. B. BARTELINK
WILLOUGHBY M. CADY
BY
William D. Hall.
ATTORNEY

United States Patent Office 2,803,820
Patented Aug. 20, 1957

2,803,820

COMPUTER

Everhard H. B. Bartelink, Cambridge, and Willoughby M. Cady, Belmont, Mass., assignors, by mesne assignments, to the United States of America as represented by the Secretary of War Application September 14, 1945, Serial No. 616,384

14 Claims. (Cl. 343—13)

This invention relates to a mechanical computer and more particularly to a mechanical computer adapted for use with airborne radio object-locating equipment.

As is well known in the art, the direction of flight and time of fall of a bomb released from an aircraft in flight will be affected by the altitude, velocity, and direction of flight of the aircraft, the direction and velocity of the wind, and the trail which is determined by the ballistic characteristics of the bomb. The term "bomb," as used in this specification, should be understood to mean any missile. The ballistic characteristics will remain substantially constant for any type of bomb, but the other conditions that affect the bomb as it falls may vary for each target and each tactical mission.

Resort has been had to certain expedients heretofore in order to compensate for the altitude and velocity of the aircraft, velocity and direction of the wind, and for the trail of the bomb so that the direction and position of the aircraft for releasing the bomb with respect to the target can be predetermined. One method of computing the release point which has been tried requires quite a long flight of the aircraft preceding the release of the bomb because with this method the aircraft must remain on a constant course while the release point is being calculated. By release point is meant a theoretically determined point in space with respect to the target at which the bomb must be released to strike the target. It is sometimes difficult to get the aircraft on the correct course due to the drift of the aircraft by the wind, and the direction of flight must be altered until a correct course of flight is established.

It would be more desirable to have a computing device which enables the aircraft to take any necessary evasive action up to a very few seconds before the time of the bomb release. In the past enemy fighters have followed the aircraft on a bombing mission and attacked when the aircraft had to quit evasive action to get on their course preceding the bomb release. The ground controlled enemy antiaircraft fire has also been directed to the area near the bomb release point where the aircraft goes into straight flight to the release point.

An object of the present invention is, therefore, to provide an improved computer which when associated with airborne object-locating equipment will make the necessary corrections so that the release point will be established for releasing bombs from an aircraft.

A further object is to provide a novel computer that will select a release point and permit the aircraft to take evasive action up to a few seconds before the bomb release.

For a better understanding of the invention, together with other and further objects thereof, reference is had to the following description taken in connection with the accompanying drawings in which:

Fig. 1 is a vector diagram which relates the release point to the target in three dimensions;

Fig. 2 is a modified vector diagram relating the release point to the target in the same plane;

Fig. 4 is a partial plan view of the computer;

Fig. 5 shows certain drum calibration curves used to determine the distance of flight of a bomb due to the velocity of the aircraft;

Fig. 6 is a block diagram of the electrical connections used with the computer; and Fig. 7 is a diagram showing a presentation as displayed on the indicator for determining the release point.

Figure 3:
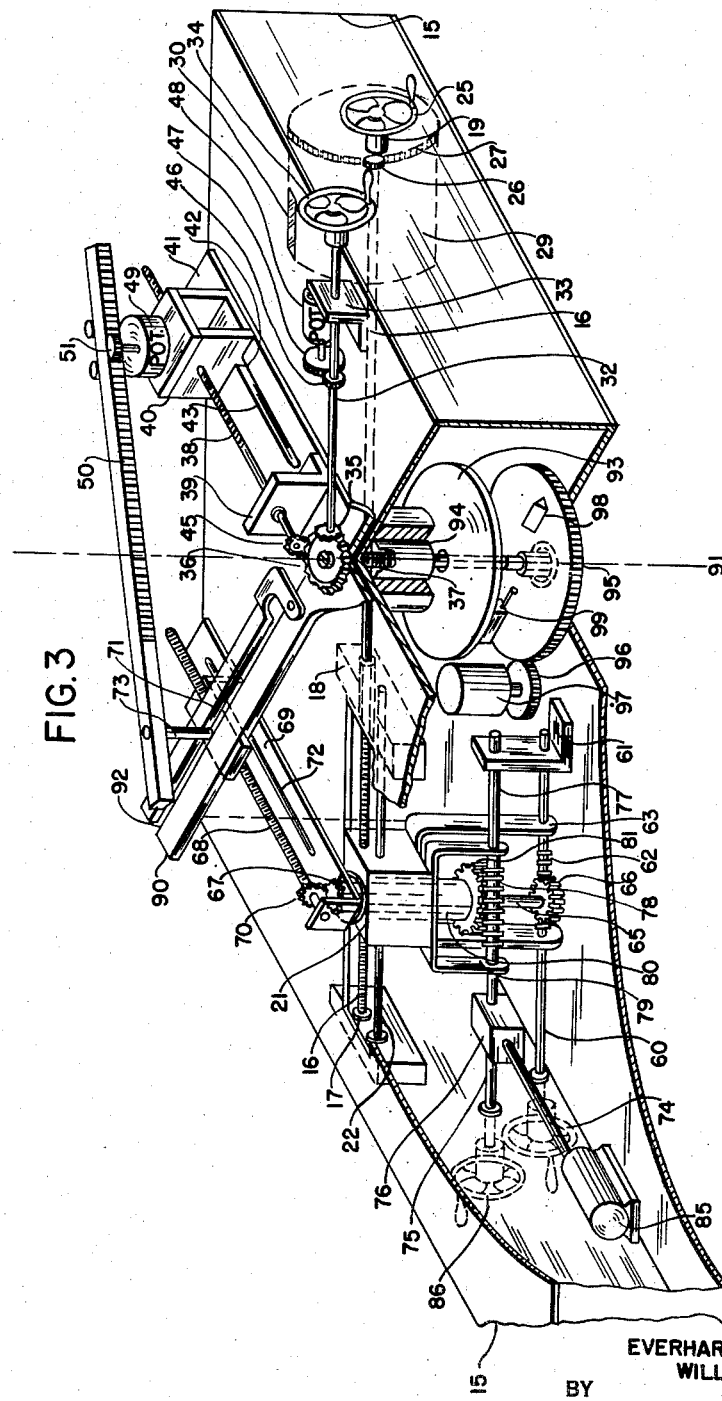
Fig. 3 is a perspective view of the computer with sections of the frame cut away.

To facilitate an understanding of the present invention, the fundamental trigonometry of the problem will be discussed before an explanation is made of the computer.

Referring now more particularly to Fig. 1, there is shown the geometric principles which are involved in the present invention.

In constructing the vector diagram which shows the relation of the bomb release P′ to the target P, a coordinate system is assumed to be fixed in the air mass 10 above the ground 11 on which the target P is located. It may be further assumed that the coordinate system moves in respect to the ground 11 in the direction of and with the velocity W of the wind. The aircraft will have an air speed V in the air mass 10. The altitude H and air speed V of the aircraft is known so that the time of fall $t_f$ of the bomb may be determined. At the moment of release of the bomb the aircraft will be at the release point P′, and the bomb will travel with the air speed V through the air mass 10. The wind drag or trail T will gradually decrease the speed of the bomb in a direction opposite the air speed V. During the time of fall $t_f$, the bombs would travel a horizontal distance $V \cdot t_f$ if there were no trail T. The horizontal distance that the bomb will travel in the air mass 10 due to the velocity of the aircraft is $(V \cdot t_f - T)$ which is represented in direction and magnitude by the vector OQ. During the time of fall $t_f$, however, the whole air mass 10 will have drifted over the ground 11, moving the bomb with it by an amount equal to $W \cdot t_f$ which is represented in direction and magnitude by the vector QP. Therefore, the total resultant horizontal distance or ground range $R_W$ will be the vector sum of $(V \cdot t_f - T)$ and $W \cdot t_f$ which is represented by the vector OP. The vector OP′ represents the altitude H of the aircraft at the release point and the vector PP′ represents the resultant slant range between the release point P′ and the target P. The vector diagram described above could be set up in a scale model, but the model would require considerable space with the greater portion of this volume vacant. It can be seen from Fig. 1 that the correct solution may be determined if the heading angle $\theta$ and a corrected ground range $R_W$ are initially known. The heading angle $\theta$ is the angle between a vertical plane passed through the release point and the target and the direction in which the aircraft must be headed at the release point to correct for wind drift of the bomb when the bomb is released from the aircraft. The heading angle $\theta$ and the ground range $R_W$ are determined on the ground plane. The slant range PP′ is determined in a vertical plane through the release point P′ and the target P. By making the calculations in the sequence outlined above, a solid geometry problem has been reduced to two plane geometry problems. Each solution may be made in any plane desired. Therefore, for simplicity and conservation of space the same plane may be used as shown in Fig. 2.

To solve the triangles for the desired information, the following data may be set to scale: the altitude vector H, the air speed times time of fall minus trail vector $(V \cdot t_f - T)$ and the wind vector $W \cdot t_f$. The vector $(V \cdot t_f - T)$ is used as the reference direction since this greatly simplifies the problem. The wind vector $W \cdot t_f$ may be set in the direction of the wind. The resultant vector PP' represents distance from a target to the release point, or slant range, for a given altitude, and the resultant angle θ represents the angle included between the line from the release point to the target and the heading which the aircraft must be taking at the release point for the bomb theoretically to strike the target.

A scale model mechanical triangle solver may be constructed for calculating the necessary information to establish a release point with respect to a target and furnish the correct heading of the aircraft as will be described with reference to Figs. 3 and 4, in which there is shown a mechanical computer which includes a frame 15 for supporting the mechanism.

An aircraft velocity vector driving mechanism comprises a shaft 16 supported by the frame 15 on bearings 17, 18 and 19. The portion of the shaft 16 between the bearings 17 and 18 is threaded and passes through a tapped head 21 so that when the shaft 16 is rotated in either direction, the tapped head 21 will be moved longitudinally in either direction along a guide rod 22. The guide rod 22 is supported on either end by the frame 15. A handwheel 25 is mounted on the end of the shaft 16 for manually rotating the shaft 16 for adjusting the position of the head 21 along the guide rod 22. A pinion gear 26 is mounted on the shaft 16 near the handwheel 25, and a gear 27 is suitably attached to a drum 29 for meshing with gear 26. The drum 29 is mounted to the frame 15 in such a manner that it will be turned by the gear 26 as the shaft 16 is rotated. The drum 29 has plotted on its surface curves such as shown in Fig. 5 which are based on the ballistic characteristics of the bomb and the velocity of the aircraft. By applying the altitude of the aircraft along the abcissa, the velocity of the aircraft times the time of fall minus trail $(V \cdot t_f - T)$ may be set directly by rotation of shaft 16 and by observing through a window 30 in the frame 15. A different set of curves will be required for each type of bomb that has different ballistic characteristics.

An altitude adjustment mechanism comprises a shaft 32 supported by an angle bracket 33. Hand wheel 34 is mounted on one end of the shaft 32 and a bevel gear 35 is mounted on the other end. The hand wheel 34 and all other hand wheels referred to in this specification used for adjusting the position of apparatus will have associated with them a calibrated dial or other obvious type of indicating device for use in determining the proper position of the hand wheel for a desired position of the apparatus. The gear 35 meshes with a gear 36 which is supported by a bearing 37. The bearing 37 is mounted on the frame 15. A threaded shaft 38 is supported by an angle bracket 39 and a tapped sliding member 40. The angle bracket 39 is rigidly attached to an altitude arm 41, and the sliding member 40 is associated with the altitude arm 41 by a guide 42 that rides in a slot 43 for guiding the sliding member 40 longitudinally of the altitude arm 41. The threaded shaft 38 is associated on one end with the sliding member 40 through a tapped opening and has suitably mounted on the other end a bevel gear 45 which meshes with gear 36. By rotating the hand wheel 34, the threaded shaft 38 will be driven by the group of gears 35, 36, and 45, moving the sliding member longitudinally of the altitude arm 41. A gear 46 is mounted to the shaft 32 to mesh with a gear 47 which is suitably connected to a potentiometer 48. The potentiometer 48 is mounted in the frame 15 and furnishes a voltage to vary the sweep voltage to correct for different altitudes as will be described later. A potentiometer 49 which is mounted on the sliding member 40 furnishes a voltage that is proportional to the slant range between the release point and the target. The voltage from the potentiometer is varied as a rack 50 is moved longitudinally and turns a pinion gear 51 suitably attached to the potentiometer 49, or as the position of sliding member 40 is changed, which will vary the position of the potentiometer 49 with respect to the rack 50.

A wind velocity mechanism comprises a slotted shaft 60 supported by a bearing in the angle bracket 61 and a bearing in the frame 15. A worm gear 62 is fitted over the slotted shaft 60 and is engaged thereto by means of a guide that rides in a slot on the shaft 60 for sliding longitudinally therewith. The position of the worm gear 62 on the slotted shaft 60 is controlled by a U-shaped frame 63 that is rigidly mounted to the head 21 and moves therewith. A shaft 65 has mounted on the lower end a gear 66 for meshing with the worm gear 62 and on the top end a bevel gear 67. A threaded shaft 68 is supported on one end by the upright portion of the wind arm 69 which will be described later and has a bevel gear 70 attached thereto for meshing with the bevel gear 67. The threaded shaft 68 is associated with a sliding support 71 through a tapped hole therein. The sliding support 71 is associated with the wind arm 69 by means of a guide, not shown, which rides in a slot 72 therein so that the sliding support 71 will move longitudinally of the wind arm 69. The rack 50 is attached to the sliding support 71 by means of a rack guide 73 which will move longitudinally of the wind arm 69 with the sliding support 71. A hand wheel 74 is mounted on the shaft 60 and when rotated, will, by the means described above, move the sliding member 71 longitudinally of the wind arm 69.

A wind direction mechanism comprises a shaft 75 supported by a bearing in the frame 15 and a differential 76. The shaft 75 is associated with the differential 76, preferably through suitable gears, in such a manner as to transmit mechanical energy to a slotted shaft 77 which passes through a worm gear 78 and is supported on the other end by the angle bracket 61. The worm gear 78 is engaged with the slotted shaft 77 by means of a guide that rides in a slot in the shaft 77 to rotate therewith. A U frame 79 is attached to the head 21 for sliding the worm gear therewith longitudinally of the shaft 77. A shaft 80 supports and is rigidly attached to the wind arm 69 and passes through the head 21 and has a gear 81 on the lower end suitably mounted thereto to mesh with the worm gear 78. A motor 85 is mechanically connected to the gears in the differential 76. The motor 85 is identified by the trade name Selsyn and receives its voltage from a Selsyn generator controlled by a compass. A hand wheel 86 is mounted on the other end of the shaft 75 and the rotation of the hand wheel 86 or the Selsyn motor 85 will drive the differential 76 which drives the shaft 77. The rotation of the shaft 77 through the worm gear 78, the gear 81 and the shaft 80 will move the wind arm 69 about the axis of the shaft 80 in a plane perpendicular to that axis.

A resultant ground range arm 90 is rigidly attached to the altitude arm 41 at an angle of 90° in the same plane so that they move together about an axis 91 which is perpendicular to that plane. The resultant ground range arm 90 has a slot 92 in which the guide 73 may slide. A disk 93 is associated with the ground range arm 90 and the altitude arm 41 combination by the shaft 94 to rotate therewith about the axis 91. A gear 95 is suitably mounted below the disk 93 to rotate when driven by means of a pinion gear 96 which is connected to the rotor of a Selsyn motor 97. The Selsyn motor 97 receives its voltage from a Selsyn generator so connected to the antenna of the associated radio object-locating equipment that the gear 95 rotates in synchronism with the antenna of the radio object-locating equipment.

A cam 98 is rigidly attached to gear 95 to actuate a microswitch 99 which is rigidly attached to the disk 93 on each revolution thereof. The micro-switch 99 furnishes an electrical voltage to the indicator, each time it is actuated by the cam 98 to provide a heading marker signal as will be described later.

Reference is now made to Fig. 6, which is a block diagram of the electrical system.

The wind direction system comprises a compass 102, preferably a flux gate compass, associated with the aircraft. The compass 102 controls a Selsyn generator 103 as indicated by the dotted line 104. The Selsyn generator 103 furnishes a voltage to the Selsyn motor 85 through an electric line 105. The Selsyn motor 85 is mechanically connected as described heretofore to the wind arm 69 and will, from a voltage furnished by the Selsyn generator 103, maintain the wind arm 68 in substantially the same direction as the direction of the wind as the aircraft changes direction with respect to the wind. The Selsyn system is not explained in detail since it is well known in the art.

A heading marker system comprises a Selsyn generator 107 mechanically connected to an antenna 108 of the radio object-locating equipment as indicated by the dotted line 109. The Selsyn motor 97 rotates the gear 95 as described heretofore in accordance with the voltage furnished by the Selsyn generator 107 through an electric line 110. As shown more clearly in Fig. 3, for each revolution of the gear 95, the cam 98 contacts the micro-switch 99 which impresses a voltage on the heading pulse generator 112 through an electrical line 113. The voltage impressed by the micro-switch 99 will cause the heading pulse generator to send an electrical signal through an electrical line 114 which will illuminate one or more marker traces on an indicator 115. Preferably the indicator 115 is of the type known as PPI (plan position indicator).

A bomb release circle system comprises the potentiometer 49 which will impress a voltage on a pip generator 117, through an electrical line 118, which is proportional to the slant range between the target and the release point. The pip generator 117, through the electrical line 119, produces a pip which will occur at such times to generate on the indicator 115 a bomb release marker circle 127, Fig. 7, whose radius is a function of the slant range.

For a description of radio-object-locating-system indicators and associated marker circuits, reference is had to section IX, pages 252–284, of "Radio System Fundamentals," Navships 900,017, published by the Bureau of Ships, Navy Department in 1944.

A variable sweep voltage curve system may be used with a hyperbolic sweep generator. The system comprises a potentiometer 48 associated with the altitude adjustment mechanism as described heretofore. The potentiometer 48 furnishes a voltage to a hyperbolic sweep generator 121 through an electrical line 122. The voltage applied to the sweep generator 121 varies the initial slope of the hyperbolic curve in accordance with the altitude of the plane so that the targets will appear on the indicator in their true positions with respect to the ground plane. For an example of a hyperbolic sweep generator, reference is had to the copending application of Jack H. Irving, Serial No. 570,412, filed December 29, 1944, now Patent No. 2,611,126, dated September 16, 1952.

Referring to Figs. 3 and 4 of the drawing, the operation of the computer will be described. It has been assumed that the velocity of the aircraft, trail of the bomb, altitude of the aircraft, and wind velocity and wind direction will be predetermined by means which are well known in the art and furnished to the operator. As has already been explained, the rotation of the hand wheel 25 will adjust the position of the tapped head 21 longitudinally of the shaft 22. This adjustment varies the distance between the points O and Q, Figs. 2 and 4, and represents the velocity of the aircraft times the time of fall minus trail of the bomb $(V \cdot t_f - T)$. As indicated in Fig. 5, by applying the anticipated altitude at which the bomb is to be released to the velocity curve $(V \cdot t_f - T)$ may be read directly on the drum 29. By proper selection of gears 26 and 27 and some means of indication associated with the window 30 in the frame 15, the hand wheel 25 may be turned to a position where the $(V \cdot t_f - T)$ will be indicated and at the same time be set in to scale and represented by the distance between the points OQ in Figs. 2 and 4.

The rotation of the hand wheel 34 will adjust the sliding member 40 longitudinally of the altitude arm 41. This adjustment varies the distance between the points O and P', Figs. 2 and 4. By means of a calibrated dial (not shown) associated with the hand wheel 34, the anticipated altitude of the aircraft at the bomb release point may be set in and will be represented to scale by the distance between the points O and P' in Figs. 2 and 4.

The wind velocity and direction of the wind at the altitudes at which high altitude bombing is done remains constant over fairly large areas. The wind velocity may be set in by rotating the hand wheel 74 to a position indicated on a calibrated dial (not shown) which indicates the wind velocity anticipated at the release point times time of fall $W \cdot t_f$. The rotation of the hand wheel 74 will adjust the position of the sliding support 71 longitudinally of the wind arm 69. The distance between the points Q and P, Figs. 2 and 4, represents the scale value of $W \cdot t_f$.

The line between the points O and Q which is $(V \cdot t_f - T)$ may be used as a reference and the direction from O to Q may be considered as the heading of the aircraft. The angle $\phi$ which is the angle between the heading of the aircraft and the direction of the wind may be adjusted by rotation of the hand wheel 86 for any particular direction of the wind with respect to the heading of the aircraft. As heretofore described, the rotation of the hand wheel 86 rotates the wind arm 69 about an axis in a plane perpendicular to that axis. This adjustment may be made by reference to a calibrated dial (not shown) associated with the hand wheel 86 to the position for setting in the desired angle $\phi$.

The setting of the wind arm 69 is maintained substantially constant with respect to the anticipated wind direction at the release point as the aircraft changes course with respect to the wind direction. As the aircraft changes heading with respect to the ground, which will be the same as with respect to the wind direction, the compass 102, Fig. 6, will drive the rotor of a Selsyn generator 103 so that the Selsyn generator 103 will impress a voltage on the Selsyn motor 85 proportional to the change in direction of the course of the aircraft. The Selsyn motor 85 will drive the wind arm 69 changing the angle $\phi$ substantially the same angle as the change in heading. Therefore, the wind arm 69 is maintained at a substantially constant direction with respect to the anticipated wind direction at the release point and the angle $\phi$ will at all times be maintained substantially the angle between the heading of the aircraft and the anticipated wind direction.

It will now be shown how the slant range PP' release point P' and heading of the aircraft OQ may be taken from the computer and presented on an indicator for predetermining the release point for any set of conditions.

As described above, the disk 93 is rigidly attached by the shaft 94 to the resultant ground range arm 90 to rotate therewith about the axis 91. The micro-switch 99 is rigidly mounted to the disk 93 so that it moves simultaneously with the resultant ground range arm 90. The cam 98 which is rigidly attached to gear 95 makes contact with the micro-switch 99 on each revolution of the gear 95 about the axis 91. The gear 95 repeats the antenna position and is driven by the antenna Selsyn combination 108, 107, and 97.

It may be first assumed that the wind velocity at the release point is zero which would reduce the angle $\theta$ to zero. In this case the heading of the aircraft would be in a vertical plane through the aircraft and the target. On each contact with the cam 98 and micro-switch 99, a voltage is impressed on the heading pulse generator 112. The heading pulse generator 112 will send an electrical signal which will illuminate a trace 125 on the indicator 115 as shown in Fig. 7. The trace 125 represents the desired heading of the aircraft on the indicator 115. If a quantity equal to the wind velocity multiplied by the time of fall, $W \cdot t_f$, is cranked into the computer, an angle will be set in between the line OQ and a resultant ground range arm 90 or the line between O and P. The micro-switch 99 will be moved with the resultant wind arm 90 an angle $\theta$. The change in position of the micro-switch 99 will change the time at which the voltage is impressed on the heading pulse generator 112. The heading pulse generator signal will be produced at a different time which is proportional to $\theta$, thereby setting up a new trace 126 which is displaced an angle equal to $\theta$ from the old trace 125. The position of the trace on the indicator 115 will change for every change in value of $\theta$ and will be proportional therewith. The use of the trace as the calculated heading for the aircraft at the release point will be described later.

As has been described, to compute the release point the altitude $(V \cdot t_f - T)$ and $W \cdot t_f$ may be set up in triangles to scale for values anticipated at the release point preceding the approach to the target. Any changes in heading of the aircraft with respect to the wind direction is fed automatically and will automatically adjust the slant range and the heading angle to compensate for the wind direction. The resultant heading angle and slant range may be mechanically solved from the triangles and converted into electrical presentations as traces on the indicator.

Referring to Fig. 7, the the slant range is represented by the radius of the trace or release circle 127 and the required heading at the release point is represented by the trace or heading marker 126.

When the aircraft comes into the range of the radio object-locating equipment with respect to the target, as is well known in the art the target indication 128 will appear on the indicator 115. The aircraft may take evasive action as it nears the target and as the target indication moves in toward the center of the indicator. It is necessary that when the target indication crosses the release circle that the operator have the aircraft headed in such a direction with respect to the target that the target indication 129, the heading marker 126, and the release circle 127 coincide. If the wind direction and velocity and the aircraft velocity and altitude were accurately determined before computing the release point, the aircraft would theoretically be at the point P' shown in Fig. 1 when the coincidence on the indicator, as described above, takes place.

It is obvious that the aircraft may approach the target from any direction and the only requirement is that at the release circle the aircraft be headed at an angle with respect to the target to compensate for the wind velocity and direction which is represented on the indicator by the heading marker.

A principal advantage of the present invention herein disclosed is that it provides a novel mechanical computer for use with the radio object-locating equipment to determine a release point for releasing bombs from an aircraft in such a manner that it enables the aircraft to take evasive action up to a few seconds before the bomb release.

Another advantage of the improved mechanical computer herein disclosed is that it can be constructed to replace existing apparatus without requiring additional space or replacing any of the major units. However, it will be understood that the present invention is not to be limited to this particular use.

While there has been described what is at present considered the preferred embodiment of the invention, it will be obvious to those skilled in the art that various changes and modifications may be made therein without departing from the spirit of the invention.

What is claimed is:

1. In combination with an aircraft and a radio object-locating equipment having at least an indicator, a sweep generating circuit, a pip generator circuit and a compass; a mechanical bomb release point computer comprising a fixed pivot means; a first movable pivot means; first adjusting means communicating with said fixed pivot means and said first movable pivot means for adjusting the distance between said fixed and first movable pivot means in accordance with the velocity of the aircraft and time of fall of the bomb and corrected for the trail of the bomb, said first adjusting means being so adapted that a line through said first movable and said fixed pivot means is fixed relative to an axis of the aircraft; second movable pivot means; third movable pivot means; supporting means mounted on said fixed pivot means and free to move thereabout, said supporting means being adapted to support said second and third movable pivot means, said supporting means being further adapted to maintain said second and third movable pivot means such that a line through said fixed pivot means and said second movble pivot means is perpendicular to a line through said fixed pivot means and said third movable pivot means, and being still further adapted to permit radial movement of said second and third movable pivot means; second adjusting means communicating with said second movable pivot means and said supporting means for adjusting the distance between said fixed pivot means and said second movable pivot means in accordance with the altitude of the aircraft; a first potentiometer means communicating with said second adjusting means and connected to the sweep generating circuit in such a manner as to vary the output thereof to the indicator in accordance with the altitude of the aircraft; third adjusting means communicating with said first and third movable pivot means for adjusting the distance between said first and third movable pivot means in accordance with the wind speed and time of fall of the bomb, said third adjusting means being further adapted to rotate about said first movable pivot means; fourth adjusting means communicating with said third adjusting means and the compass for maintaining an angle between a line connecting said first and third movable pivot means and a line connecting said fixed and first movable pivot means substantially equal to the angle between the wind direction and the aircraft direction; second potentiometer means rigidly attached to said second movable pivot means; means communicating with said third movable pivot means and the movable portion of said second potentiometer means for adjusting said second potentiometer means in accordance with the calculated slant range of the aircraft from its target, said potentiometer connected to the pip generator circuit to vary the output thereof for providing a bomb release circle on the indicator in accordance with the calculated slant range to the target; and means for generating a heading marker at such a time as to produce a trace on the indicator at an angle with respect to the aircraft direction substantially equal to the angle between a line through said first movable pivot means and said fixed pivot means and a line through said third movable pivot means and said fixed pivot means whereby the coincidence of said heading marker, said bomb release circle and the target indication indicates the correct bomb release point.

2. A mechanical computer for computing the relationship between a first vector having a given magnitude and lying in a given reference direction, a second vector having a given magnitude and disposed at a given angle with respect to said reference direction, and a third vector having a given magnitude and disposed at a right angle with respect to the resultant of said first and second vectors; said computer comprising a fixed first member having a pivot point, a movable second member having a pivot point, means for maintaining the position of the pivot point of said second member on a line lying in said reference direction and passing through the pivot point of said first member, means for adjusting the distance between the pivot points of said first and second members in accordance with a given proportion of the magnitude of said first vector, a longitudinal third member pivotally mounted on the pivot point of said second member, means for rotating said third member so that said third member assumes said given angle with respect to said reference direction, a fourth movable member having a pivot point mounted on said third member, means for adjusting the distance between the pivot points of said second and fourth members in accordance with said given proportion of the magnitude of said second vector, a fifth member having first and second arms disposed at right angles to each other, said fifth member being pivotally mounted at the apex of said arms on the pivot point of said first member, said first arm extending to and coupled to the pivot point of said fourth member in a manner such that said fourth member pivot point is capable of movement along the length of said first arm, a sixth member having a pivot point movably mounted on said second arm, means for adjusting the distance between said sixth-member-pivot point and said first-member-pivot point in said given proportion to the magnitude of said third vector, whereby the distance between said fourth-member-pivot-point and said sixth-member-pivot-point is equal to said given proportion of the resultant of said first, second, and third vectors.

3. A computer, according to claim 2, further comprising a longitudinal seventh member pivotally mounted on said fourth member pivot point, said seventh member extending to said sixth member pivot center, rotatable means pivotally mounted on said sixth member pivot center, said seventh member being effective in turning said rotatable means in response to a change in the magnitude of the resultant of said first, second, and third vectors, and means for indicating the angular position of said rotatable means whereby the resultant of said first second, and third vectors is determined.

4. A computer according to claim 3 further comprising means for measuring the angle included between the first arm of said fifth member and said reference direction, said means including an element coupled to said fifth member and angularly positioned by the movement thereof, and means responsive to said element for effecting an indication.

5. A computer according to claim 2 further comprising means for measuring the angle included between the first arm of said fifth member and said reference direction, said means including an element coupled to said fifth member and angularly positioned by the movement thereof, and means responsive to said element for effecting an indication.

6. A mechanical computer for computing the relationship between a first vector having a given magnitude and a given reference direction, a second vector having a given magnitude and forming a given angle with said reference direction, and a third vector having a given magnitude and forming a fixed angle with respect to the resultant of said first and second vectors; said computer comprising a first mechanical linkage triangle having adjustable parameters for effecting a summation of said first vector and said second vector to obtain a first resultant as a function of the side of said first triangle opposite said given angle, said first mechanical linkage triangle being so constructed that the magnitudes of said first and second vectors and the included angle between them are each independently variable; and a second mechanical linkage triangle having adjustable parameters, wherein said aforementioned side of said first triangle is common to said second triangle, for effecting a summation of said first resultant and of said third vector, to obtain an ultimate resultant of said first, second, and third vectors as a function of that side of said second triangle disposed opposite said predetermined angle.

7. A computer as defined in claim 6 further including means for indicating the magnitude of the said resultant of said first, second, and third vectors, said indicating means including an element, connected to the side of said second triangle constituting said ultimate resultant.

8. A computer as defined in claim 7 further including means for measuring the angle included between said first vector and the resultant of said first and second vectors, said means including an element attached to that side of said first triangle constituting said first resultant and angularly positioned by the movement thereof, and means responsive to the angular position of said element for effecting an indication.

9. A computer as defined in claim 6 further including means for measuring the angle included between said first vector and the resultant of said first and second vectors, said means including an element attached to that side of said first triangle constituting said first resultant and angularly positioned by the movement thereof, and means responsive to the angular position of said element for effecting an indication.

10. A device for the indication of a bomb release point comprising a first triangular member having adjustable sides and adjustable included angles, means to adjust one side of said member to a length proportional to the air speed of an aircraft times the time of fall of the bomb less the trail of the bomb, means to adjust a second side of said member to a length proportional to the wind speed times the time of fall of the bomb, means to adjust the included angle between said sides equal to the angle between wind and aircraft directions, thereby obtaining the third side of said member, a second triangular member having one side equal to said third side of said first member, means to adjust a second side of said second triangular member to a length proportional to the altitude of the aircraft, the included angle between the third side of said first member and the second side of said second member being equal to 90°, thereby determining the third side of said second member, means to establish a trace on an indicator of a radio object locating device differing from a reference aircraft direction by an angle which is equal to the angle between said first and third sides of said first triangular member, means to establish a circle on said indicator having a radius proportional to said third side of said second triangle whereby the bomb release point is determined by the coincident occurrence of said trace, said circle and the target indication on said indicator.

11. An apparatus for indicating a bomb release point comprising in combination with a radio object-locating device having an indicator, a first triangular member having adjustable sides and adjustable included angles, means on said member for adding a first vector representing that component of the horizontal distance traversed by a falling bomb due to the velocity of an aircraft to a second vector representing that component of said distance due to the wind velocity to obtain a resultant vector for computing the angle between said first vector and said resultant vector at which the aircraft must head with respect to a target in order that a bomb released at the proper point will strike the target, means for generating and applying a radial marker to said indicator at an angle with respect to said aircraft heading which is equal to the angle between said first vector and said resultant vector, a second triangle member having adjustable sides and adjustable included angles providing means for adding said horizontal resultant vector to a vector representing the height of said aircraft for computing the slant range to the target at the release point, and means for generating and applying a circular marker having a radius representing said slant range on the indicator of the radio object-locating device whereby the appearance of the desired target on the intersection of said radial marker and said circular indicator indicates the desired release point.

12. A device for indicating when an aircraft has reached a bomb release point comprising a cathode ray indicating tube, target locating means operable to cause a plan position indication of the location of said target with respect to said aircraft to appear on the face of said tube, a computer into which known information relative to aircraft altitude, bomb velocity and wind velocity may be fed, said computer yielding a first output proportional to the slant range of the target, and a second output proportional to the heading angle between the direction of flight and a vertical plane containing the target and said bomb release point, means to describe a bomb release circular trace on the face of said tube, said circular trace having a radius proportional in magnitude to the magnitude of said second output, means to describe a radial heading line on the face of said indicator, said radial heading line having an angular displacement proportional to said heading angle whereby the calculated heading and location of the aircraft at the calculated bomb release point will be indicated when the plan position indication of said target, the bomb release circular trace and said radial heading line coincide on the face of said indicator.

13. A device for indicating when an aircraft has reached a bomb release point comprising an indicating device, target locating means operable to cause a plan position indication of said target with respect to said aircraft to appear on the face of said indicating device, a computer into which known information relative to aircraft altitude, bomb velocity and wind velocity may be fed, said computer yielding a first output proportional to the slant range of the target, and a second output proportional to the heading angle between the direction of flight and a vertical plane containing the target and said bomb release point, means to describe a bomb release circular trace on the face of said indicating device, said circular trace having a radius proportional in magnitude to the magnitude of said second output, means to describe a radial heading line on the face of said indicating device, said radial heading line being indicative of the heading of the aircraft and having an angular displacement proportional to said heading angle so that at the time the indication of said target crosses said bomb release circular trace the calculated bomb release point will be indicated if the aircraft is then heading in a direction such that the radial heading line passes through the indication of said target.

14. A mechanical computer comprising a frame, a pair of arms having a fixed angular relationship therebetween pivoted to said frame at a first pivot means, for rotation about the intersection of said pair of arms in a plane containing each arm, a second arm, means to rotate said second arm about a second pivot means on said frame in a plane parallel to the plane of rotation of said pair of arms, means to adjust the distance along a fixed line between said first and second pivot means, one of said pair of arms intersecting said second arm at a third pivot means, and means to adjust the distance between said second and third pivot means whereby the distance between said first and third pivot means measured on the first of said pair of arms represents the resultant of a first triangle determined by the distance between the first and second pivot means, the distance between the second and third pivot means and the angular adjustment of said second arm, a fourth pivot means, means to move said fourth pivot means along the second of said pair of arms whereby the distance between said third and fourth pivot means represents the resultant of a second triangle determined by the resultant of said first triangle, the distance between said first and fourth pivot means and the fixed included angle between said pair of arms.

References Cited in the file of this patent

UNITED STATES PATENTS

| | | |
|---|---|---|
| 1,149,085 | Renstrom | Aug. 3, 1915 |
| 1,466,416 | Whitaker | Aug. 23, 1923 |
| 1,784,929 | Estoppey | Dec. 16, 1930 |
| 2,105,147 | Inglis | Jan. 11, 1938 |
| 2,370,753 | Reece | Mar. 6, 1945 |
| 2,412,632 | Sanders | Dec. 17, 1946 |
| 2,414,108 | Knowles | Jan. 14, 1947 |
| 2,438,112 | Darlington | Mar. 23, 1948 |
| 2,438,522 | Smith | Mar. 30, 1948 |
| 2,480,208 | Alvarez | Aug. 30, 1949 |
| 2,528,502 | De Florez | Nov. 7, 1950 |

FOREIGN PATENTS

| | | |
|---|---|---|
| 135,691 | Great Britain | Dec. 4, 1919 |